United States Patent
Lee

(10) Patent No.: US 7,394,461 B2
(45) Date of Patent: Jul. 1, 2008

(54) DISPLAYING APPARATUS AND METHOD FOR CONTROLLING THE SAME

(75) Inventor: Eun-bae Lee, Suwon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 212 days.

(21) Appl. No.: 10/199,004

(22) Filed: Jul. 22, 2002

(65) Prior Publication Data
US 2003/0137502 A1  Jul. 24, 2003

(30) Foreign Application Priority Data
Jan. 24, 2002 (KR) ................ 2002-4273

(51) Int. Cl.
G09G 5/00 (2006.01)
(52) U.S. Cl. .............. 345/212; 345/211; 345/213; 345/55; 345/204
(58) Field of Classification Search ........ 345/211, 345/212–213, 204, 55; 713/300, 310, 324
See application file for complete search history.

(56) References Cited

U.S. PATENT DOCUMENTS

| | | | | |
|---|---|---|---|---|
| 4,870,407 A * | 9/1989 | Gill | ............ | 345/537 |
| 5,675,364 A * | 10/1997 | Stedman et al. | ............ | 345/211 |
| 5,708,819 A * | 1/1998 | Dunnihoo | ............ | 713/323 |
| 5,764,547 A * | 6/1998 | Bilich et al. | ............ | 713/321 |
| 6,724,351 B1 * | 4/2004 | Boger | ............ | 345/3.2 |
| 6,773,348 B2 * | 8/2004 | Stockdale | ............ | 463/29 |
| 2002/0113907 A1 * | 8/2002 | Endo et al. | ............ | 348/730 |

FOREIGN PATENT DOCUMENTS

| | | |
|---|---|---|
| JP | 7-56658 | 3/1995 |
| JP | 11-184577 | 7/1999 |
| JP | 2000-89866 | 3/2000 |
| JP | 2000-242371 | 9/2000 |
| KR | 93-20235 | 9/1993 |
| KR | 1994-23209 | 10/1994 |
| KR | 1996-1093 | 1/1996 |
| KR | 1997-7575 | 2/1997 |
| KR | 1998-15197 | 5/1998 |
| KR | 1998-72753 | 11/1998 |
| KR | 1999-3573 | 1/1999 |
| KR | 2000-2552 | 2/2000 |
| KR | 2000-21543 | 4/2000 |
| KR | 20-203132 | 9/2000 |
| KR | 2000-18149 | 10/2000 |

* cited by examiner

*Primary Examiner*—Richard Hjerpe
*Assistant Examiner*—Leonid Shapiro
(74) *Attorney, Agent, or Firm*—Staas & Halsey LLP

(57) ABSTRACT

A displaying apparatus includes a connector having a DDC communication pin which communicates with a video card provided in a computer main body, a video signal processing unit which processes picture signals supplied through the connector, a power circuit unit which converts commercial alternating current (AC) power into driving voltages, and a controlling unit which controls power supplied to each of signal processing units from the power circuit unit to be on or off in response to existence or non-existence of DDC voltage signals input through the DDC communication pin of the connector. Accordingly, power of the displaying apparatus is controlled to be on or off in response to a power-on or off state of the computer main body, and allows the power thereof to be consumed at a minimum level under the condition of a stand-by power mode.

11 Claims, 4 Drawing Sheets

FIG. 2

| SIGNAL STATE | SELECTION OF MUX | DDC VOLTAGE SIGNAL (VIDEO CARD) | CONTROL SIGNAL FOR POWER ON OR OFF (CONTROLLING UNIT) | OUTPUT BY MUX | POWER OUTPUT |
|---|---|---|---|---|---|
| | HIGH | 5V | X | HIGH | NORMAL VOLTAGE(3.3V, 5V, 12V) |
| | HIGH | 0V | X | LOW | OUTPUT INTERRUPTED(0V) |
| | LOW | X | HIGH | HIGH | NORMAL VOLTAGE(3.3V, 5V, 12V) |
| | LOW | X | LOW | LOW | OUTPUT INTERRUPTED(0V) |

DISPLAYING APPARATUS AND METHOD FOR CONTROLLING THE SAME

CROSS-REFERENCE TO RELATED APPLICATIONS

This application claims the benefit of Korean Patent Application No. 2002-4273 filed on Jan. 24, 2002, in the Korean Industrial Property Office, the disclosure of which is incorporated herein by reference.

BACKGROUND OF THE INVENTION

1. Field of the Invention

The present invention relates to displaying apparatuses, and more particularly, to a displaying apparatus whose power supply is cut off in response to power supply to a computer main body being cut off.

2. Description of the Related Art

In general, personal computer systems are categorized into portable computers and desktop computers. The former comprises a system body integrally combined with a displaying apparatus, whereas the latter comprises a computer main body and a displaying apparatus, both of which are separate from each other.

The displaying apparatus of the desktop computers is connected to the computer main body by a connector, and processing picture signals are supplied to the displaying apparatus from a video card provided within the computer main body.

FIG. 4 shows a conventional displaying apparatus of a desktop computer having a liquid crystal display (LCD) monitor. The displaying apparatus comprises a D-sub connector 31 connected to a video card (not shown) of a computer main body (not shown), a video signal processing unit 33 which processes horizontal/vertical (H/V) synchronous signals and RGB signals supplied through the D-sub connector 31, an LCD panel 35 which displays picture signals processed in the video signal processing unit 33, a power circuit unit 43 which converts commercial alternating current (AC) power into driving powers (1.5V and 3.3V, etc.,) and supplies the driving powers to each of signal processing units (for example, the video signal processing unit 33 and the LCD panel 35), and a controlling unit 39 which controls the power circuit unit 43 to supply the driving powers to each of the signal processing units in response to a power switch 37 being selected to be power-on.

Here, the computer main body and the displaying apparatus of the desktop computer have their own power switches. Accordingly, the respective power switches of the computer main body and the displaying apparatus need to be turned on or off separately when the computer system is turned on or off, thereby making it inconvenient to use the desktop computer system.

To solve this problem, displaying apparatuses have recently employed a power controlling method in which power supplied to each driving circuit from a power circuit unit is interrupted where synchronous signals are not inputted through a D-sub connection port. However, voltages are continuously supplied to a sensing circuit which senses the synchronous signals even though a video card is not in operation because power supplied to the computer main body is cut off. Therefore, a maximum power saving effect is not realized.

SUMMARY OF THE INVENTION

Accordingly, it is an object of the present invention to provide a displaying apparatus whose power supply is on or off in accordance with power-on or off of a computer main body, and a method of controlling the same. According to another object of the present invention, the displaying apparatus allows a minimum amount of power to be consumed under the condition of a power stand-by.

Additional objects and advantages of the invention will be set forth in part in the description which follows and, in part, will be obvious from the description, or may be learned by practice of the invention.

To achieve the above and other objects of the present invention, there is provided a displaying apparatus comprising a connector having a data display channel (DDC) communication pin which communicates with a video card provided in a computer main body, a video signal processing unit which processes picture signals supplied through the connector, a power circuit unit which converts commercial alternating current (AC) power into driving voltages, and a controlling unit which controls power supplied to each of signal processing units from the power circuit unit to be on or off in response to existence or non-existence of a DDC voltage signal input through the DDC communication pin of the connector.

According to an aspect of the present invention, the displaying apparatus further comprises a synchronous signal sensing unit which senses whether a synchronous signal is output from the connector, wherein the controlling unit outputs a power control signal to turn the power supplied to the signal processing units on or off according to the synchronous signal of the synchronous signal sensing unit.

According to another aspect of the present invention, the displaying apparatus further comprises a selecting unit which selectively supplies either of the DDC voltage signal supplied through the connector or the power control signal from the controlling unit, to the power circuit unit. The selecting unit may include a multiplexer (MUX) which selectively outputs one of input signals.

To achieve the above and other objects of the present invention, there is provided a method of controlling power supplied to a displaying apparatus which supports a DDC communication with a video card provided in a computer main body, the method comprising sensing whether a DDC voltage signal is input to the displaying apparatus from the video card and turning power supplied to each of signal processing units of the displaying apparatus on or off in response to whether the DDC voltage signal is input.

According to yet another aspect of the present invention, the method further comprises turning the power supplied to each of the signal processing units on or off, in response to the video card not supporting the DDC communication, based on existence or nonexistence of a synchronous signal supplied from the video card.

BRIEF DESCRIPTION OF THE DRAWINGS

These and other objects and advantages of the present invention will become apparent and more readily appreciated from the following description of the embodiments, taken in conjunction with the accompanying drawings of which:

FIG. 2 is a table showing output signals of a multiplexer (MUX) corresponding to existence or non-existence of DDC voltage signals;

DETAILED DESCRIPTION OF THE PREFERRED EMBODIMENTS

Figure 1:
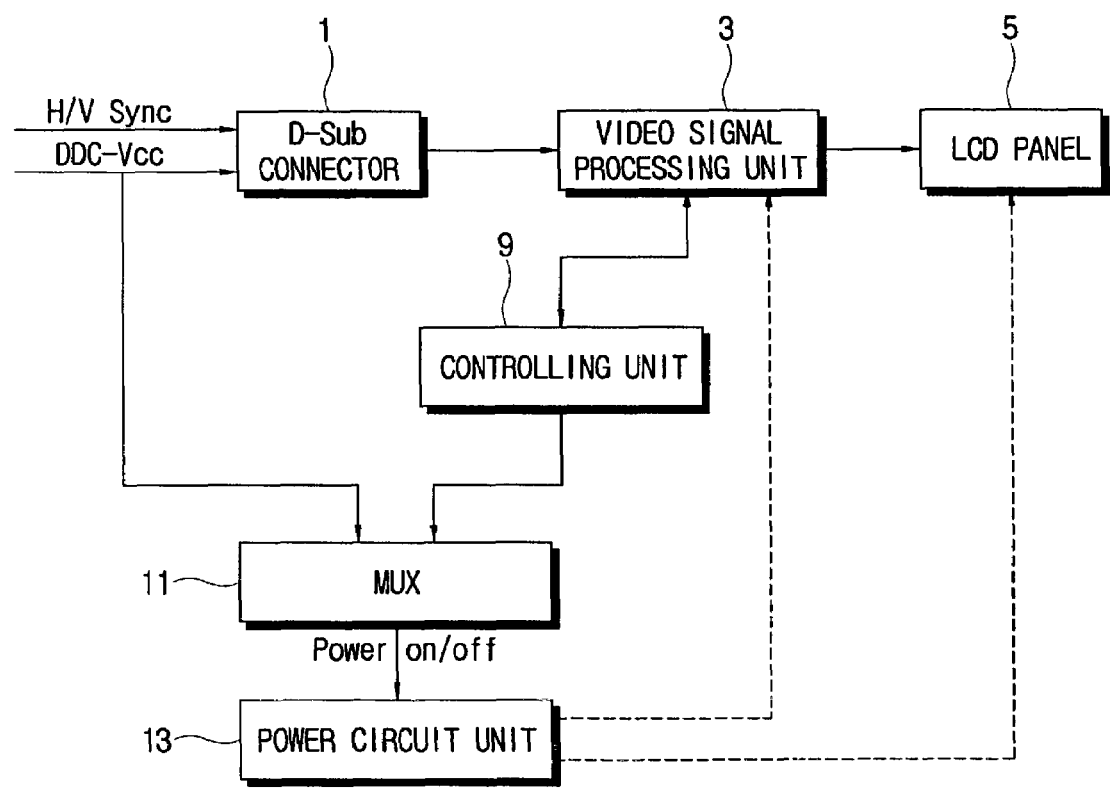
FIG. 1 is a control block diagram of a displaying apparatus according to an embodiment of the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 shows a control block diagram of a displaying apparatus according to an embodiment of the present invention. As an illustrational purpose, the displaying apparatus having a liquid crystal display (LCD) panel 5 (LCD monitor) will be described below.

The LCD monitor comprises a D-sub connector 1 connected to a video card of a computer main body (now shown), a video signal processing unit 3 which receives H/V synchronous signals and RGB video signals supplied through the D-sub connector 1, converts the RGB video signals into digital signals based on the H/V synchronous signals and controls sizes of the RGB video signals to output the RGB video signals, the LCD panel 5 which displays picture signals processed in the video signal processing unit 3, a synchronous signal sensing unit (not shown) which senses the H/V synchronous signals, a power circuit unit 13 which supplies driving powers to each of signal processing units, a controlling unit 9 which outputs a power control signal to the power circuit unit 13 so as to allow power to the signal processing units other than the synchronous signal sensing unit (not shown) to be turned on or off according to whether a synchronous signal is sensed.

The LCD monitor which supports a DDC communication with the video card of the computer main body (not shown) further comprises a DDC memory chip (not shown) which stores information about, for example, its manufacturer and its resolution to be actually displayed. The D-sub connector 1 is provided with a DDC communication pin formed with a plurality of pins. The DDC communication pin includes a data pin into which information about the displaying apparatus is transmitted, a clock pin into which synchronous signals synchronizing data are input, and a DDC voltage signal pin which supplies voltages to the DDC memory chip on its own where power supplied to the displaying apparatus is cut off, so as to read out the information about the display apparatus.

The LCD monitor according to the present invention further includes a multiplexer (MUX) 11 which functions as a selecting unit to selectively provide either a DDC voltage signal supplied from the D-sub connector 1, or the power control signal supplied from the controlling unit 9 so as to provide for an instance where the video card of the computer main body does not support the DDC communication or the D-sub connector 1 is not installed with the DDC communication pin thereon.

An output signal output from the MUX 11 is set by the controlling unit 9 according to whether the DDC voltage signal is output from the D-sub connector 1, where the displaying apparatus is initially connected to the computer main body. A register (not shown) having setup status information thereof is provided in the MUX 11, and the MUX 11 can thereby output either of the DDC voltage signal or the power control signal into the power circuit unit 13 according to the set-up status of the register. The power circuit unit 13 of the LCD monitor turns on or off a voltage supplied into each of the signal processing units (for example, the video signal processing unit 3 and the LCD panel 5) in response to existence or non-existence of the DDC voltage signal or according to the power control signal.

FIG. 2 is a table showing output signals of the MUX 11 according to an existence or non-existence of DDC voltage signals. The controlling unit 9 controls the output signal of the MUX 11 based on the output signal table in FIG. 2. In other words, where a DDC voltage signal from the D-sub connector 1 is sensed, a "high" signal is applied to the MUX 11 and the DDC voltage signal is set up to be output in an output terminal of the MUX 11. Where the DDC voltage signal is not sensed, a "low" signal is applied to the MUX 11 and a power control signal output from the controlling unit 9 is set up to be output.

The power circuit unit 13 controls power supplied to or interruption of the power supplied to each of the signal processing units depending upon the output signal output from the MUX 11. Where the controlling unit 9 sets up the output signal of the MUX 11 as the DDC voltage signal, the MUX 11 outputs a "high/low" output signal to the power circuit unit 3 depending upon a state (5V, 0V) of the DDC voltage signal input, and therefore, the power circuit unit 13 turns on or off the power of each of the signal processing units.

Figure 3:
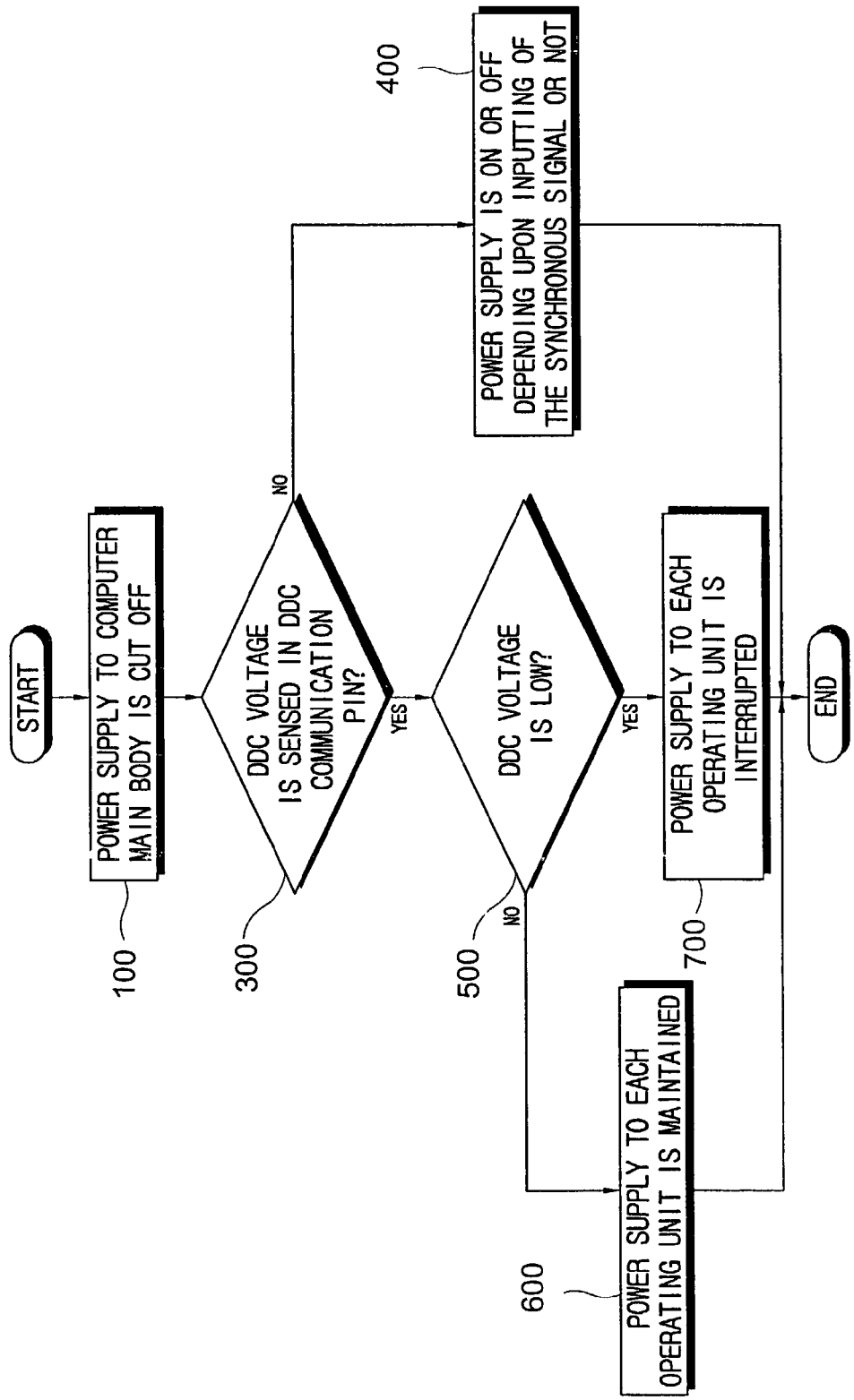
FIG. 3 is a control flow chart illustrating a method of controlling the displaying apparatus shown in FIG. 1.
Figure 4:
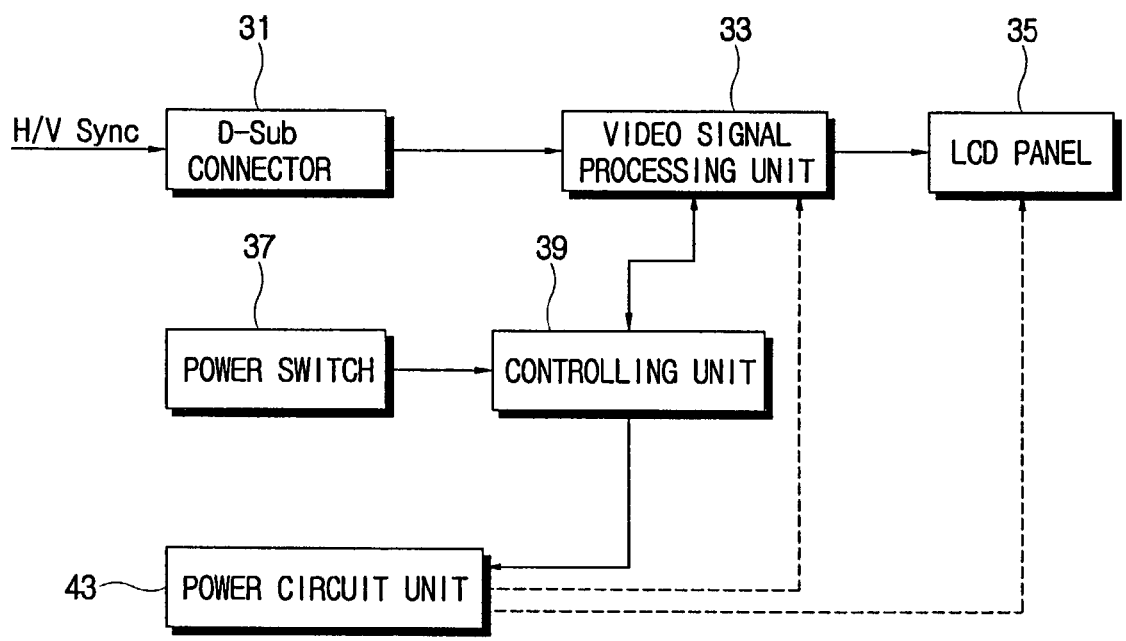
FIG. 4 is a control block diagram of a conventional displaying apparatus.

FIG. 3 shows a control flow chart illustrating a method of controlling the displaying apparatus shown in FIG. 1. As shown in FIG. 3, where power supplied to a computer system is cut off in operation 100, in the case of existence of a DDC communication pin, the controlling unit 9 checks a DDC voltage signal pin in the DDC communication pin of the D-sub connector 1 to sense whether a DDC voltage signal has been input in operation 300, and determines whether the DDC voltage is, for example, "5V" or "0V" in operation 500. The controlling unit 9 determines that the system power of the computer main body is cut off where the DDC voltage signal is "0V", and then interrupts power supplied to each of the signal processing units in operation 700. However, since the computer system is in operation where the DDC voltage signal is "5V," the controlling unit 9 supplies the power to each of the signal processing units, for example, to thereby drive the displaying apparatus in operation 600.

Where the DDC communication pin does not exist in the D-sub connector 1 or the DDC voltage signal is not input because the computer system does not support the DDC communication, the controlling unit 9 controls the power supplied to each of the signal processing units based on whether a synchronous signal is input from a video card in operation 400.

While an LCD displaying apparatus has been described above, the present invention can also be applied to other display devices, such as cathode ray tube (CRT) monitors, which support a DDC communication.

In addition, while a MUX has been described to select either a power control signal of a controlling unit or a DDC voltage signal, other switching circuits may be used.

As described above, where a DDC communication pin is checked but a DDC voltage ("high" signal) is not sensed when system power of the computer system is cut off, it is determined that the system power is cut off and power supplied to each of signal processing units is interrupted. Accordingly, power supplied to a displaying apparatus is controlled to be on or off in response to a power state of a computer main body.

The present invention provides a displaying apparatus whose power supply is controlled to be on or off in response to a state of power (on or off) of a computer main body and a method of controlling the same. Accordingly, power consumption of the displaying apparatus in a state of a power stand-by mode can be minimized.

It is understood that a system which uses the present invention may also include permanent or removable storage, such as magnetic and optical discs, RAM, ROM, etc., on which the operation and data structures of the present invention can be stored and distributed. The operations can also be distributed via, for example, downloading over a network such as the Internet.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A displaying apparatus communicating with a video card provided in a computer main body, comprising:
   a connector communicating with the video card provided in the computer main body;
   a video signal processing unit which processes picture signals supplied through the connector;
   a power circuit unit which converts commercial alternating current (AC) power into driving voltages;
   a controlling unit which controls power supplied to each signal processing unit of the displaying apparatus from the power circuit unit to selectively be on or off in response to existence or non-existence of a data display channel (DDC) voltage signal from the computer and a sensing of a synchronous signal output from the connector; and
   a selecting unit which selectively supplies either the DDC voltage signal supplied through the connector or a power control signal from the controlling unit to the power circuit unit to control the selective turning on or off of the power supplied to the signal processing unit, with the selective supplying being based on existence of the synchronous signal and the DDC voltage signal, wherein the selecting unit is a multiplexer (MUX) which selectively outputs one of the DDC voltage signal and the power control signal,
   wherein:
      the MUX comprises a register which includes set-up status information of the displaying apparatus, and
      the controlling unit controls the MUX to output either of the DDC voltage signal or the power control signal according to the register.

2. The displaying apparatus according to claim 1, further comprising a synchronous signal sensing unit which senses whether the synchronous signal is output from the connector.

3. The displaying apparatus according to claim 1, wherein the signal processing units comprise:
   a display panel; and
   the video signal processing unit.

4. The displaying apparatus according to claim 1, wherein the controlling unit controls the power supplied to the signal processing unit from the power circuit to be selectively on or off in response to the DDC voltage signal so as to minimize a power consumption of the displaying apparatus in a power stand-by mode.

5. The displaying apparatus of claim 1, wherein the DDC voltage signal is provided through the connector, the connector having a data display channel (DDC) communication pin which communicates with the video card provided in the computer main body.

6. A computer system comprising:
   a computer main body including a video card which outputs picture signals; and
   a displaying apparatus including:
      a connector communicating with the video card,
      a video signal processing unit which processes the picture signals supplied through the connector,
      a power circuit unit which provides driving voltages,
      a controlling unit which selectively controls power, supplied to each signal processing component of the displaying apparatus, in response to existence or non-existence of a DDC voltage signal input from the computer and a sensing of a synchronous signal output from the connector, and
      a selection unit which selectively supplies either the DDC voltage signal or a power control signal to the power circuit unit based on existence of the synchronous signal and the and DDC voltage signal, wherein the selection unit is a multiplexer (MUX) which selectively outputs one of the DDC voltage signal and the power control signal,
   wherein:
      the MUX comprises a register which includes set-up status information of the displaying apparatus, and
      the controlling unit controls the MUX to output either of the DDC voltage signal or the power control signal according to the register.

7. The computer system according to claim 6, wherein:
   the displaying apparatus further includes a synchronous signal sensing unit which senses whether the synchronous signal is output from the connector, and
   the controlling unit outputs the power control signal to selectively turn the power supplied to the signal processing unit of the displaying apparatus on or off based on the sensed synchronous signal.

8. The computer system of claim 6, wherein the DDC voltage signal is provided through the connector, the connector having a data display channel (DDC) communication pin which communicates with the video card provided in the computer main body.

9. A displaying apparatus communicating with a video card provided in a computer main body, comprising:
   a connector having a data display channel (DDC) communication pin which communicates with the video card provided in the computer main body;
   a video signal processing unit which processes video signals supplied through the connector;
   a display panel which displays the video signals processed in the video signal processing unit;
   a power circuit unit which converts commercial alternating current (AC) power into driving voltages and supplies the power to the signal processing unit and the display panel when a DDC voltage is detected;
   a controlling unit which generates a power control signal to control the power circuit unit to supply the power to the signal processing unit and the display panel when the video signals are supplied from the connector, and not to supply the power to the signal processing unit and the display panel when the video signals are not supplied from the connector; and
   a multiplexer (MUX) which selectively outputs one of the DDC voltage signal and the power control signal, wherein the MUX comprises a register which includes set-up status information of the displaying apparatus, and the controlling unit controls the MUX to output either of the DDC voltage signal or the power control signal according to the register.

10. The displaying apparatus according to claim 9, further comprising a synchronous signal sensing unit which senses whether the synchronous signals is output from the connector, wherein the controlling unit which generates the power control signal to control the power circuit unit to supply the power to the signal processing unit and the display panel when the synchronous signals are sensed, and not to supply the power to the signal processing unit and the display panel when the synchronous signals are not sensed.

11. The displaying apparatus according to claim 9, wherein the power circuit unit turns on or off the power supplied to the signal processing unit and to the display panel according to one of the DDC voltage signal and the power control signal.

* * * * *

UNITED STATES PATENT AND TRADEMARK OFFICE
CERTIFICATE OF CORRECTION

| | | |
|---|---|---|
| PATENT NO. | : 7,394,461 B2 | Page 1 of 1 |
| APPLICATION NO. | : 10/199004 | |
| DATED | : July 1, 2008 | |
| INVENTOR(S) | : Eun-bae Lee | |

It is certified that error appears in the above-identified patent and that said Letters Patent is hereby corrected as shown below:

Column 6, Line 20 Claim 6, before "DDC" delete "and".

Signed and Sealed this

Sixteenth Day of December, 2008

JON W. DUDAS
*Director of the United States Patent and Trademark Office*